W. S. WORTHINGTON.
Arrangement for Heating Evaporating Pans.
No. 22,601.  Patented Jan. 11, 1859.
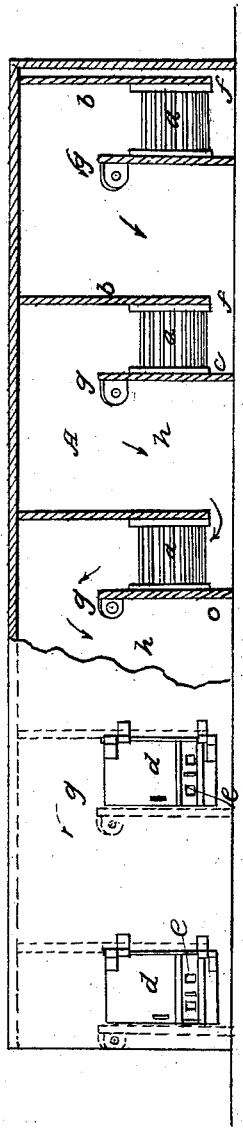
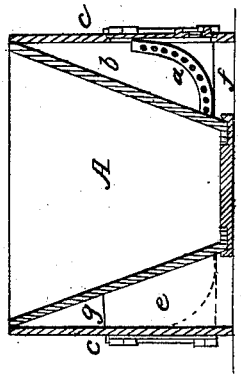
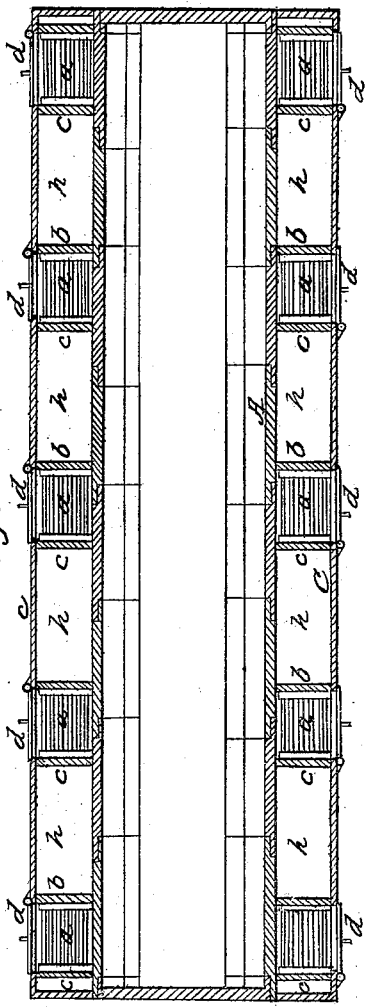
Witnesses:
Inventor:
William S. Worthington

UNITED STATES PATENT OFFICE.

WM. S. WORTHINGTON, OF NEWTOWN, NEW YORK.

IMPROVEMENT IN APPARATUS FOR EVAPORATING.

Specification forming part of Letters Patent No. 22,691, dated January 11, 1859.

*To all whom it may concern:*

Be it known that I, WILLIAM S. WORTHINGTON, of Newtown, in the county of Queens and State of New York, have invented a new and improved arrangement of grated fire-places and flues for heating evaporating-pans in the manufacture of salt and other substances obtained by evaporation; and I do hereby declare that the following is a full, clear, and exact description of the same, reference being had to the accompanying drawings, making part of this specification, in which—

Figure 1 is a side view of a pan with part of its outer casing removed to show the arrangement of the grates and flues. Fig. 2 is a transverse vertical section of the same. Fig. 3 is a horizontal section of the same.

The objects of this invention are the economical use of coal as fuel for heating evaporating-pans, and the application of the heat in such a manner as to prevent the burning of the salt or substance precipitated on the bottom of the pan, and the consequent burning out of the said pan.

To enable others to make and use my invention, I will proceed to describe its construction and operation.

A is the pan, made of cast-iron, with a flat bottom, and with its sides parallel longitudinally, but inclining outward from bottom to top, and with vertical ends.

C C are side casings of iron or masonry extending from the top to the bottom of the pan and the whole length of each side, and each containing several fire-places whose fronts and bottoms are composed of grates *a a*, and their sides of transverse partitions *b b* and *c c*, of iron or masonry, extending from the outer walls of the casings to the sides of the pan, and whose backs are formed by the sides of the pan itself. These fire-places are at equal distances apart, and opposite to each there is a door, *d*, in the outer wall of the casing C to admit the coal, and in each door is an air-register, *e*, to admit air below the grate to support combustion. The partitions *b b* extend from the top of the pan and external walls of the casing C downward as far as the bottoms of the grates, and have openings *f f* below them; and the partitions *c c* extend from the bottom of the pan and external walls of the casing C to or above the bottom of the grate, and have openings *g g* above them.

The spaces *h h* between the fire-places constitute flues. At one end of each casing there is an opening leading to a chimney.

The pan being filled with brine, and fires having been made in the several grates, and the doors *d d* closed, the operation is as follows: Air in sufficient quantity to support combustion is admitted under the several grates by the registers *e e* in their respective doors, and the smoke and gaseous products of combustion pass from the several grates through the passages *f f g g* and flues *h h*, as indicated by arrows in Fig. 1, toward those ends of the casings C C at which is situated the chimney, the inflammable gaseous products of combustion escaping from the first grate in each casing, passing through the adjacent flue *h*, and being wholly or for the most part consumed by passing through the second one, and those escaping through the second one passing through the next flue *h*, and being wholly or for the most part consumed by passing through the third one, and so on throughout the whole series, the heated products thus passing over the whole of the sides of the pan, which present a very extensive heating-surface, and a very perfect and complete combustion of the gases being effected before arriving at the chimney, which serves to produce a draft and carry off the incombustible gases. While the whole of both sides of the pan constitute heating-surfaces, the bottom of the pan is left comparatively cool, so that the salt or other substance which is caused to be precipitated thereon is not caused to cake and burn, so as to be difficult of removal, and to cause the burning of the pan, as is the case in the salt-pans heated in the ordinary way—viz., by fires or flues under their bottoms; and no precipitation of any consequence taking place on the heating-surfaces, the conducting of the heat to the liquid is not interfered with.

The pan A may be of any convenient length, and may be made of plates fitted and secured together by screws or rivets. Several short pans may be employed, placed end to end, and heated by a single and continuous train of communicating fire-places on each side of the train of pans, which may be extended to as great a length as the continuous trains of communicating fire-places can be used with advantage. The pans may have upright or curved sides; but I consider the inclined form of the sides to afford the best provision for an economical application of heat. An artificial draft may be employed; but I have found by experiment on a considerable scale that my arrangement of fire-places works well with the natural draft of the chimney.

I do not claim, broadly, any arrangement of fires and flues for heating the sides without heating the bottoms of evaporating-pans; but

What I claim as my invention, and desire to secure by Letters Patent, is—

The arrangement of a series of two or more grated fire-places, $a\ b\ c$, and communicating passages $f\ g$ and flues $h\ h$ in a casing, C, on each or either side of a pan or train of pans, substantially as and for the purpose herein set forth.

WILLIAM S. WORTHINGTON.

Witnesses:
  W. HAUFF,
  WM. TUSCHE.